(12) United States Patent
Jones et al.

(10) Patent No.: US 10,433,641 B2
(45) Date of Patent: *Oct. 8, 2019

(54) STOCK LEVEL INDICATION APPARATUS AND METHOD

(71) Applicant: Walmart Apollo, LLC, Bentonville, AR (US)

(72) Inventors: Nicholaus A. Jones, Fayetteville, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,258

(22) Filed: Oct. 16, 2018

(65) Prior Publication Data

US 2019/0045925 A1 Feb. 14, 2019

Related U.S. Application Data

(63) Continuation of application No. 15/709,834, filed on Sep. 20, 2017, now Pat. No. 10,130,177.

(Continued)

(51) Int. Cl.
| | |
|---|---|
| *G06Q 20/00* | (2012.01) |
| *A47B 96/02* | (2006.01) |
| *G06Q 20/20* | (2012.01) |
| *G01B 11/06* | (2006.01) |
| *G06Q 10/08* | (2012.01) |
| *G01B 11/16* | (2006.01) |

(Continued)

(52) U.S. Cl.
CPC ........ *A47B 96/021* (2013.01); *G01B 11/0608* (2013.01); *G01B 11/16* (2013.01); *G01G 19/00* (2013.01); *G01G 19/4144* (2013.01); *G06Q 10/087* (2013.01); *G06Q 20/203* (2013.01); *A47F 2010/025* (2013.01)

(58) Field of Classification Search
CPC .......................... G06Q 20/203; G06Q 10/087
See application file for complete search history.

(56) References Cited

U.S. PATENT DOCUMENTS

| | | |
|---|---|---|
| 3,628,807 A | 12/1971 | Fullington |
| 3,631,820 A | 1/1972 | Taber |

(Continued)

OTHER PUBLICATIONS

PCT; App. No. PCT/US2017/051973; International Search Report and Written Opinion dated Nov. 20, 2017.

(Continued)

*Primary Examiner* — Ramsey Refai
(74) *Attorney, Agent, or Firm* — Fitch, Even, Tabin & Flannery LLP

(57) ABSTRACT

In some embodiments, apparatuses and methods are provided herein useful to provide a visual indication of a weight of products stocked on a display assembly, such as a shelf of a shelving unit. The visual indication is provided by virtue of the display assembly having a product support member that sequentially flattens as additional weight is added thereto. A laser device can be mounted proximate to the assembly and oriented to determine a distance to the product support member and a control circuit can be configured to receive the distance and analyze the distance to determine a deflection of the product support member to determine a current stock level.

19 Claims, 5 Drawing Sheets

Related U.S. Application Data

(60) Provisional application No. 62/397,015, filed on Sep. 20, 2016.

(51) Int. Cl.
    *G01G 19/414*    (2006.01)
    *G01G 19/00*     (2006.01)
    *A47F 10/02*     (2006.01)

(56) References Cited

U.S. PATENT DOCUMENTS

| | | | | |
|---|---|---|---|---|
| 3,863,724 | A * | 2/1975 | Dalia, Jr. | G01G 3/1406 177/1 |
| 4,064,994 | A | 12/1977 | Ondrasik, II | |
| 4,109,396 | A | 8/1978 | Fraser | |
| 4,785,945 | A | 11/1988 | Rowse | |
| 4,961,533 | A | 10/1990 | Teller | |
| 5,333,746 | A | 8/1994 | Bustos | |
| 5,671,362 | A | 9/1997 | Cowe | |
| 5,915,824 | A | 6/1999 | Straat | |
| 7,007,815 | B2 | 3/2006 | Anderson | |
| 7,381,910 | B1 | 6/2008 | Wilkerson | |
| 7,518,068 | B2 | 4/2009 | Green | |
| 8,260,456 | B2 | 9/2012 | Siegel | |
| 8,499,942 | B1 | 8/2013 | Coretti, Jr. | |
| 8,649,900 | B2 | 2/2014 | Jung | |
| 9,308,922 | B2 | 4/2016 | Sain | |
| 1,570,911 | A1 | 9/2017 | Jones | |
| 1,570,981 | A1 | 9/2017 | Jones | |
| 1,570,983 | A1 | 9/2017 | Jones | |
| 1,578,564 | A1 | 10/2017 | Jones | |
| 1,580,235 | A1 | 11/2017 | Jones | |
| 1,580,236 | A1 | 11/2017 | Jones | |
| 1,580,334 | A1 | 11/2017 | Jones | |
| 1,580,900 | A1 | 11/2017 | Jones | |
| 1,582,496 | A1 | 11/2017 | Jones | |
| 1,013,017 | A1 | 11/2018 | Jones | |
| 1,016,973 | A1 | 1/2019 | Jones | |
| 2005/0171854 | A1 | 8/2005 | Lyon | |
| 2005/0279722 | A1 * | 12/2005 | Ali | A47F 10/00 211/59.3 |
| 2006/0071774 | A1 | 4/2006 | Brown | |
| 2006/0164247 | A1 | 7/2006 | Overhultz | |
| 2008/0077510 | A1 | 3/2008 | Dielemans | |
| 2008/0103939 | A1 | 5/2008 | Gibb | |
| 2008/0283436 | A1 | 11/2008 | Tagliaferri | |
| 2009/0121017 | A1 | 5/2009 | Cato | |
| 2010/0287703 | A1 | 11/2010 | Zapata | |
| 2012/0138672 | A1 * | 6/2012 | Herwig | G06K 7/10722 235/375 |
| 2014/0201042 | A1 | 7/2014 | Meyer | |
| 2014/0279290 | A1 | 9/2014 | Rimnac | |
| 2015/0052029 | A1 | 2/2015 | Wu | |
| 2015/0090683 | A1 | 4/2015 | Sabounjian | |
| 2015/0262116 | A1 | 9/2015 | Katircioglu | |
| 2016/0048798 | A1 | 2/2016 | Meyer | |
| 2017/0142373 | A1 | 5/2017 | Black | |
| 2017/0147966 | A1 | 5/2017 | Aversa | |
| 2017/0148005 | A1 | 5/2017 | Murn | |
| 2017/0193430 | A1 | 7/2017 | Barreira Avegliano | |
| 2017/0228686 | A1 | 8/2017 | Bermudez Rodriguez | |
| 2018/0060803 | A1 | 3/2018 | Cheruku | |
| 2018/0060804 | A1 | 3/2018 | Cheruku | |
| 2018/0078038 | A1 | 3/2018 | Jones | |
| 2018/0082245 | A1 | 3/2018 | Jones | |
| 2018/0082246 | A1 | 3/2018 | Jones | |
| 2018/0089613 | A1 | 3/2018 | Chen | |
| 2018/0107972 | A1 | 4/2018 | Jones | |
| 2018/0108120 | A1 | 4/2018 | Venable | |
| 2018/0125267 | A1 | 5/2018 | Jones | |
| 2018/0127118 | A1 | 5/2018 | Jones | |
| 2018/0130009 | A1 | 5/2018 | Jones | |
| 2018/0130015 | A1 | 5/2018 | Jones | |
| 2018/0130078 | A1 | 5/2018 | Jones | |
| 2018/0158017 | A1 | 6/2018 | Jones | |
| 2019/0045925 | A1 | 2/2019 | Jones | |

OTHER PUBLICATIONS

PCT; App. No. PCT/US2017/052401; International Search Report and Written Opinion dated Dec. 1, 2017.

U.S. Appl. No. 15/709,812; Notice of Allowance dated May 15, 2018.

U.S. Appl. No. 15/709,812; Notice of Allowance dated Sep. 10, 2018.

U.S. Appl. No. 15/709,834; Notice of Allowance dated Jul. 18, 2018.

U.S. Appl. No. 15/709,834; Office Action dated Mar. 22, 2018.

* cited by examiner

STOCK LEVEL INDICATION APPARATUS AND METHOD

CROSS-REFERENCE TO RELATED APPLICATION

This application is a continuation of U.S. application Ser. No. 15/709,834, filed Sep. 20, 2017, entitled STOCK LEVEL INDICATION APPARATUS AND METHOD, which claims the benefit of U.S. Provisional Application No. 62/397,015, filed Sep. 20, 2016, all of which are incorporated herein by reference in their entirety.

TECHNICAL FIELD

This invention relates generally to retail shelving and, more particularly, to stocking level indicating shelving assemblies.

BACKGROUND

Tracking inventory within a retail location can be important to a retailer. For example, if a product is out of stock on the shelf, the retail location could be losing potential sales. As such, retail locations can send associates around the store to check on stock levels, but this can waste time and money when stock levels are satisfactory. Additionally, while a retail location may be able to determine a general number of customers within a store, it can be more difficult to determine how many products customers are purchasing, which can lead to long check-out lines and low stock levels.

BRIEF DESCRIPTION OF THE DRAWINGS

Disclosed herein are embodiments of systems, apparatuses and methods pertaining to a shelving assembly that provides an indication of a stocking level of products on the shelving assembly. This description includes drawings, wherein.

Figure 1:
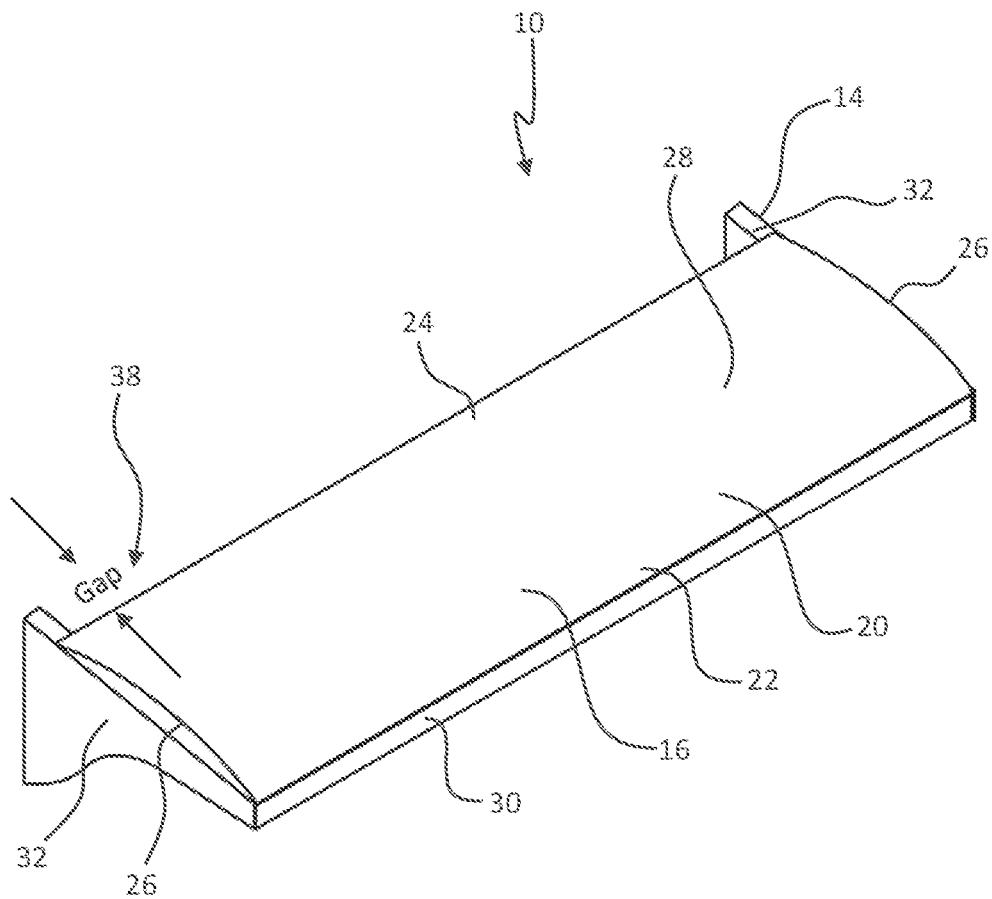
FIG. 1 is a perspective view of a product display assembly having a product support member with a curved configuration in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to provide a measurable indication of a weight of products stocked on a display assembly, such as a shelf of a shelving unit. With information about the products stocked on the display assembly, a number of products corresponding to the weight can be determined. The measurable indication is provided by virtue of the display assembly having a product support member with a curved configuration that sequentially flattens as additional weight is added thereto.

More specifically, a product display assembly is described herein that utilizes the accumulated weight of products stocked thereon to flatten a curved product support member thereof. A laser device can be mounted proximate to the assembly and oriented to project a beam to the product support member to determine a distance to the product support member based on a reflection of the beam therefrom. The distance indicates a deflection of the product support member, which can then be used to determine a stock level for the products stocked thereon. Accordingly, the assembly and electronic imaging device described herein advantageously avoids having to manipulate or remove products to determine a current stock level and helps a retail location avoid being out of product on the shelf.

By some approaches, a control circuit can be configured to receive the distance from the laser device and analyze the distance to determine a current stock level. For example, the control circuit can be configured to estimate a weight of the products on the assembly based on a determined deflection amount of the curved product support member. Utilizing the estimated weight and the type of product stocked on the shelf, an approximate number of products on the shelf can be extrapolated.

An example product display assembly 10 is shown in FIGS. 1-4. The product display assembly 10 can be any structure used to display products 12 for sale, such as shelves mounted to walls or shelving units, tables, etc. The product display assembly 10 includes a frame 14 and a product support member 16 mounted to the frame 14 and configured to receive the products 12 thereon.

As shown, the product support member 16 has a curved configuration such that a lower surface 18 is concave and an upper surface 20 thereof is convex. The product support member 16 of this form is generally rectangular with front and rear edge portions 22, 24 extending between side edge portions 26, such that, in an unstocked state, the product support member 16 has a raised intermediate portion 28 with respect to the front and rear edge portions 22, 24 thereof. So configured, as products 12 are stocked on the product support member 16, the weight of the products 12 sequentially flattens the curved configuration of the product support member 16 can causes it to deflect, and the amount of deflection provides a visual and measurable indication of the accumulated weight of the products 12.

The frame 14 includes at least a front portion 30 and lateral portions 32 extending rearwardly from the front portion 30. If desired, the frame 14 can further include a back portion. In some embodiments, the front edge portion 22 of the product support member 16 mounts to the frame 14 along the front portion 30 thereof. Preferably, the product support member 16 is pivotably coupled to the frame 14 so that as products 12 are stocked thereon and the curved configuration thereof sequentially flattens, the front edge portion 22 can pivot and the rear edge portion 24 can freely slide rearwardly along the lateral portions 32 of the frame 14. In the illustrated form, the lateral portions 32 of the frame 14 are aligned with the side edge portions 26 of the product support member 16. In further forms, the frame 14 can include one or more intermediate lateral portions 32 for additional support.

The product display assembly 10 can advantageously be utilized in conjunction with a laser device 34 and a control circuit 36 to remotely monitor a stock level of the products 12 on the product display assembly 10. More specifically, the laser device 34 can be configured to project a beam to the product support member 16, such as continuously, periodically, or on command, and receive a reflection of the beam therefrom to thereby measure a distance to the product support member 16. The measured distance can then be sent to the control circuit 36, such as over a wired or wireless connection, for analysis. The control circuit 36 can analyze the measured distance to the product support member 16 to determine the weight of products 12 stocked thereon.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 36 may be configured (for example, by using corresponding programming stored in a memory as will be well understood by those skilled in the art) to carry out one or more of the steps, actions, and/or functions described herein.

The control circuit 36 can be calibrated so that a subsequent configuration of the product support member 16 can be associated with a weight of products 12 stocked thereon. For example, the control circuit 36 can receive a distance to the product support member 16 in an unstocked configuration and a distance to the product support member 16 in a fully stocked configuration. As the weight of products 12 in the fully stocked configuration is known, the control circuit 36 can associate the deflection or flattening of the product support member 16 indicated by the distance to the weight of the products 12 to thereby create a projection for future comparison. Additionally, after the control circuit 36 determines the total weight stocked on the product support member 16, the control circuit 36 can determine which product 12 is stocked thereon and the individual weight of each to extrapolate the number of products 12 currently stocked on the assembly 10. The product information, include weight and location information, can be stored on one or more remote or local storage devices 42, such as server and/or database devices, accessible by the control circuit 36 over wired or wireless connections.

In one example, the product display assemblies 10 can be shelves mounted to a shelving unit 44. Based on a particular use, multiple shelving units 44 can be aligned in a row to produce an aisle in a retail location. The shelving unit 44 includes a base portion 46 and a back wall 48 extending upwardly therefrom. The base portion 46 can include a base deck 50 and a kick plate 52, as commonly configured. A plurality of shelf notches 54 are vertically disposed adjacent to lateral edges 56 of the back wall 48 to provide anchor points for the shelves 10 mounted to the shelving unit 44, and specifically for the lateral portions 32 of the frame 14. When the shelves 10 are mounted to the back wall 48, there is a gap 38 between the product support member 16 and the back wall 48 that sequentially decreases in width as products 12 are stocked on the shelf 10 and the product support member 16 flattens. After the shelving unit 44 is assembled, associates can then stock products 12 on the shelves 10.

Figure 2:
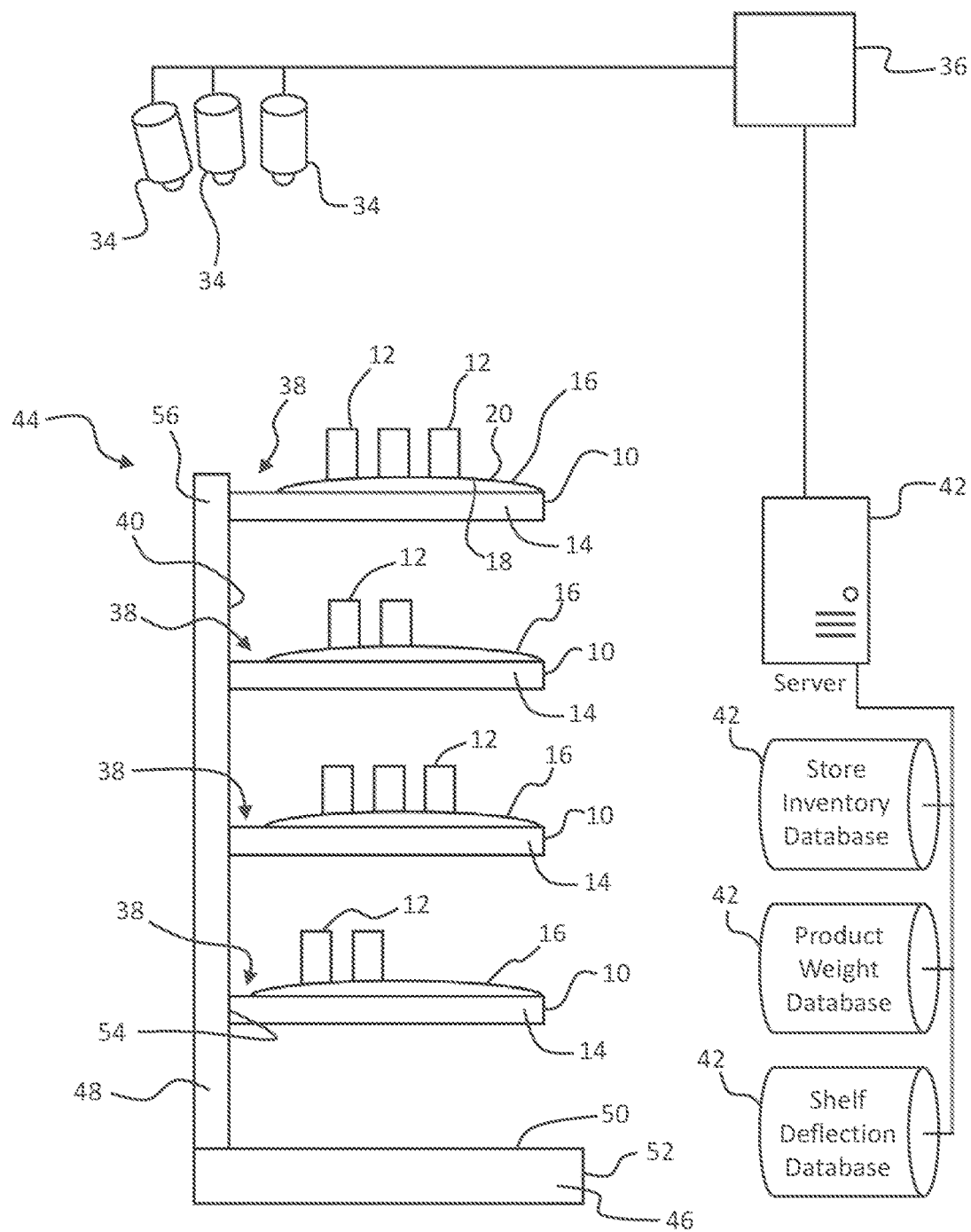
FIG. 2 is a side elevational view of a first example shelving unit having product display assemblies mounted thereto scanned by laser devices in accordance with several embodiments.

In a first form, as shown in FIG. 2, the back wall 48 can have an upstanding, generally vertical configuration, such that the shelves 10 are stacked one above the other. By one approach, the shelves 10 can be mounted to the back wall 48 with similar configurations and gap 38 sizes. One or more laser devices 34 can be mounted adjacent to the shelving unit 44 so that the deflection of the product support member 16 of each can be monitored by measuring the distance thereto. By one approach, the imagers 34 can be mounted at a plurality of angles with respect to vertical to view the shelving unit 44 from a variety of orientations and thereby monitor all of the product support members 16. The laser devices 34 can preferably be mounted to a ceiling, with lower shelves 10 accessible by the laser devices 34 through the gaps 38 of the upper shelves 10. Other mounting options can include on adjacent shelving units 44, on walls adjacent to the shelving unit 44, or the like. If desired, in one example, a movable or pivotable laser device 34 can be mounted to the ceiling to monitor all of the shelves 10 mounted to the shelving unit 44. In another example, a laser device 34 can be mounted to the ceiling to monitor the shelves 10 mounted at the top of the shelving unit 44 and one or more laser devices 34 can be mounted adjacent to a side or bottom of the shelving unit 44 to monitor intermediate and lower shelves 10.

By another approach, the shelves 10 can have gaps 38 of varying sizes. For example, the topmost shelf 10 can have the largest gap 38, and the gaps 38 of subsequent shelves 10 can be sequentially decreased so that the width of each gap 38 is visible from above the shelving unit 44. A similar configuration could work with a laser device 34 mounted within the base deck and the largest gap 38 on the lowermost shelf 10. If desired, any gaps 38, or portions thereof, can be covered using a transparent cover to prevent products 12 from falling through the gap 38. The varying gap sizes can be achieved by differently sized product support members 16 or by altering the mounting structure of the shelves 10, such T-bar mounting structures for modular units.

Figure 3:
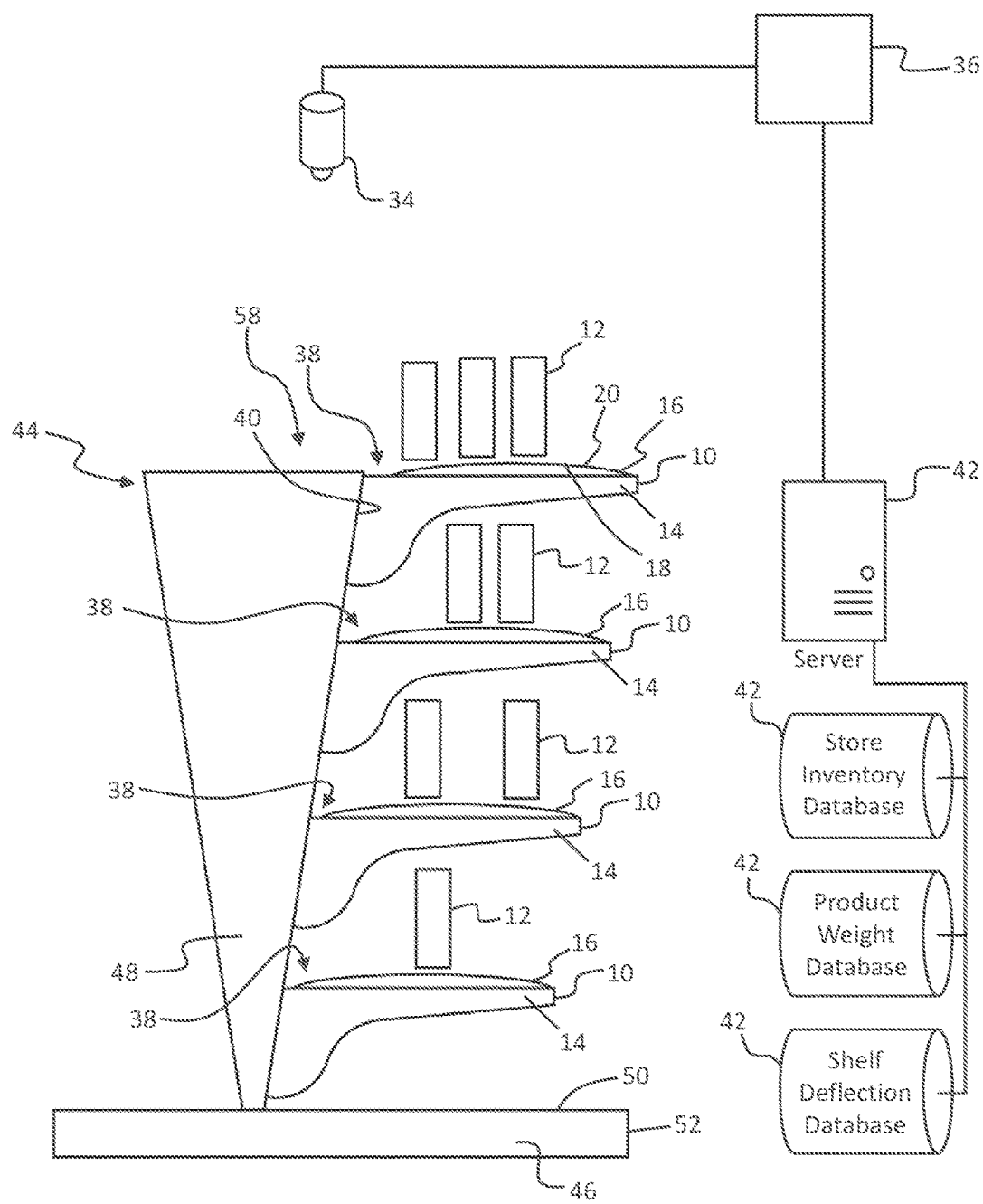
FIG. 3 is a side elevational view of a second example shelving unit having product display assemblies mounted thereto scanned by laser devices in accordance with some embodiments.
Figure 4:
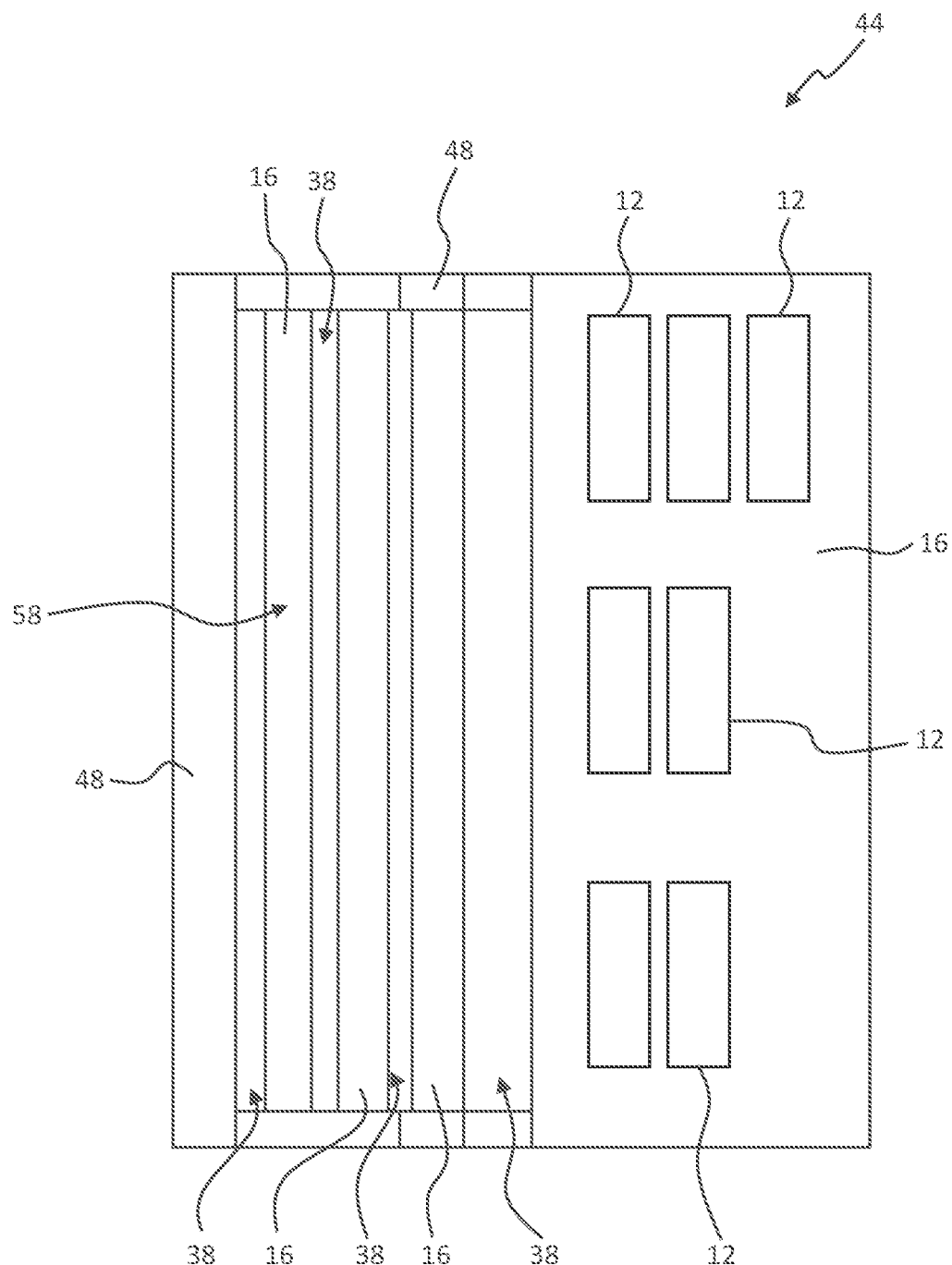
FIG. 4 is a top plan view of the shelving unit of FIG. 3 in accordance with several embodiments.

By another approach, as shown in FIGS. 3 and 4, the back wall 48 can have an angled configuration such that it tapers outwardly as it extends away from the floor and the back end of each shelf 10 is visible from above. If desired, the back wall 48 can have a triangular configuration with shelves 10 mounted to one or both sides thereof. The back wall 48 can further include an open or transparent top 58 so that lower mounted shelves 10 are visible from above the shelving unit 44. So configured, a single laser device 34 mounted above the shelving unit 44 can monitor each of the product support members 16 of the shelves 10 through the open top 58. For example, the laser device 34 can be configured to pivot to direct beams at the various shelves 10.

Figure 5:
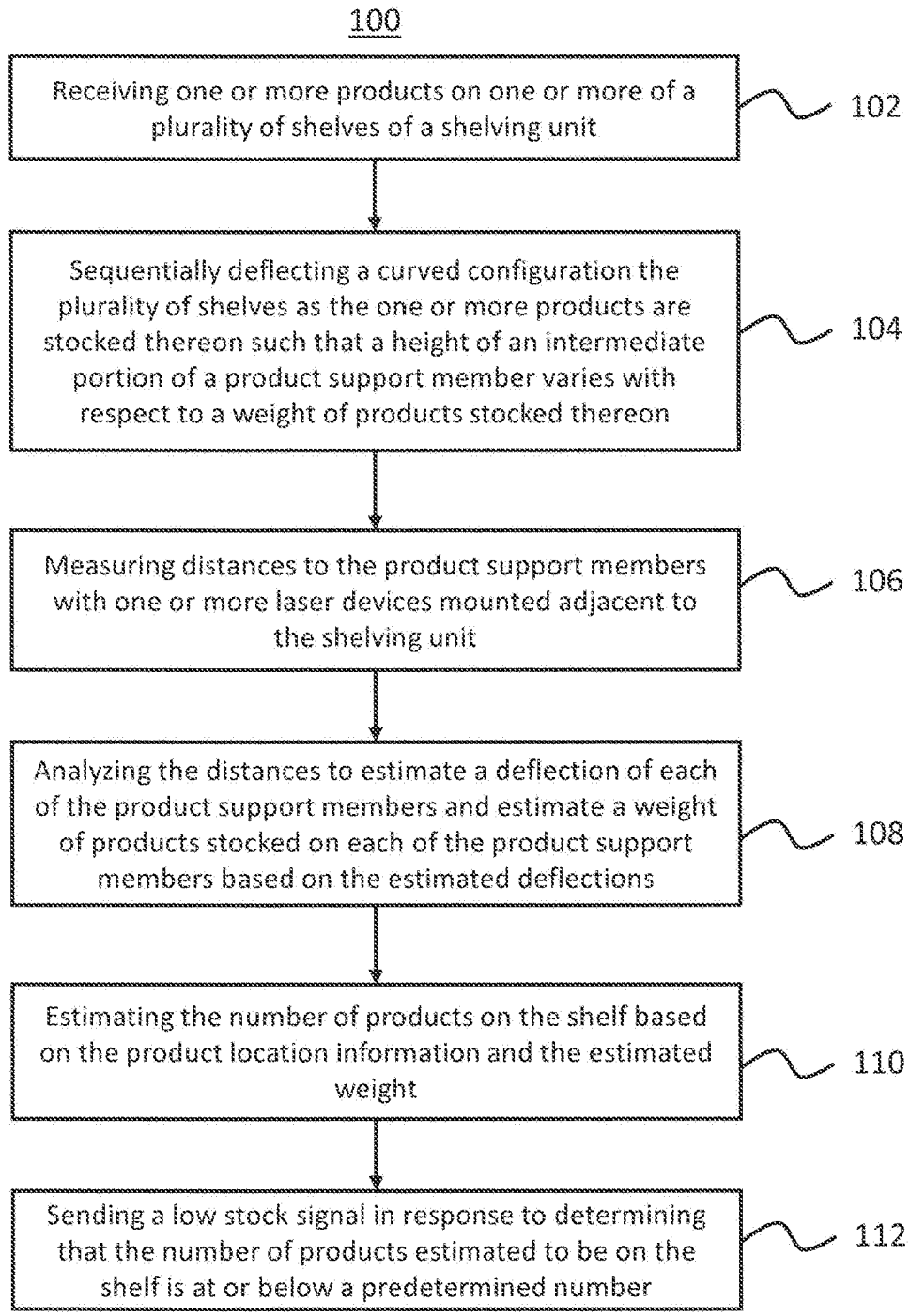
FIG. 5 is a flowchart in accordance with some embodiments.

So configured, the product display assembly 10, configured as described herein, can be utilized within a retail location to monitor stock levels and determine 100 a current stock level as shown in FIG. 5. More specifically, an associate at a retail location can stock products 12 on the product support member 16 of the assembly 10. As the products 12 are received 102 on the product support member 16, the curved configuration thereof sequentially flattens 104 due to the weight of the products 12. The laser device 34 can then measure 106 a distance to the product support member 16, which is based on the deflection of the product support member 16 thereof. The control circuit 36 receives the measured distance and analyzes 108 the distance to determine a deflection of the product support member 16. The control circuit 36 then compares the deflection to the projection for the product support member 16 created from the calibration to estimate 108 a total weight of the stocked products 12. The control circuit 36 can also access the product information to determine the weight of each product 12 and estimate 110 a total number of products 12 stocked on the shelf 10 based on the estimated weight. The control circuit 36 can compare the total number of products 12 to a predetermined number, set in advance as corresponding to a low stock level, and can send 112 a low stock signal in response to determining that the total number is at or below the predetermined number. If desired, the low stock signal can create a work flow task to send an associate to check on the stock level and/or restock the shelf 10 with products 12.

In some embodiments, a stock level indication system is described herein that includes a shelving unit, one or more laser devices, and a control circuit in communication with the one or more laser devices. The shelving unit includes an upstanding back wall; and a plurality of shelves mounted to the back wall, where the plurality of shelves each include a product support member having a curved configuration with a convex upper surface and concave lower surface such that an intermediate portion of the product support member is raised with respect to outer edges thereof. The curved configuration of the product support members is configured to sequentially deflect as products are stocked thereon such that a height of the intermediate portion of the product support member varies with respect to a weight of products stocked thereon. The one or more laser devices are mounted adjacent to the shelving unit and oriented to measure distances to the product support members; and the control circuit is configured to analyze the distances to estimate a deflection of each of the product support members and estimate a weight of products stocked on each of the product support members based on the estimated deflections.

By several approaches, the control circuit is configured to be calibrated by analyzing distances of the product support members with the intermediate portions at a maximum height thereof corresponding to an unstocked configuration and analyzing distances of the product support members with the intermediate portions at a minimum height thereof corresponding to a fully stocked configuration.

By some approaches, the control circuit is further configured to: access product location information; and estimate the number of products on the shelf based on the product location information and the estimated weight. By further approaches, the control circuit is configured to send a low stock signal in response to determining that the number of products estimated to be on the shelf is at or below a predetermined number.

By several approaches, the plurality of shelves are mounted to the back wall such that there is a gap between the product support member and the back wall; a depth of the gap varies with the deflection of the product support member; and the one or more laser devices are oriented to measure distances of product support members of lower shelves through the gaps.

In several embodiments, a method for determining a stock level is described herein that includes receiving one or more products on one or more of a plurality of shelves of a shelving unit, the shelving unit including an upstanding back wall and the plurality of shelves mounted thereto, the plurality of shelves each including a product support member having a curved configuration with a convex upper surface and concave lower surface such that an intermediate portion of the product support member is raised with respect to outer edges thereof; sequentially deflecting the curved configuration of the one or more of the plurality of shelves as the one or more products are stocked thereon such that a height of the intermediate portion of the product support member varies with respect to a weight of products stocked on the product support member; measuring distances to the product support members with one or more laser devices mounted adjacent to the shelving unit; and analyzing the distances with a control circuit in communication with the one or more laser devices to estimate a deflection of each of the product support members and estimate a weight of products stocked on each of the product support members based on the estimated deflections.

By some approaches, the method further comprises calibrating the control circuit by analyzing distances of the product support members having a maximum height of the intermediate portion corresponding to an unstocked configuration and analyzing distances of the product support members having a minimum height of the intermediate portion corresponding to a fully stocked configuration.

By several approaches, the method further comprises: accessing product location information; and estimating the number of products on the shelf based on the product location information and the estimated weight. By further approaches, the method comprises sending a low stock signal in response to determining that the number of products estimated to be on the shelf is at or below a predetermined number.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A stock level indication system comprising:
   a shelving unit comprising:
      an upstanding back wall;
      a plurality of shelves mounted to the back wall, the plurality of shelves each including a product support member having an intermediate portion of the product support member that is deflectable with respect to outer edges thereof, wherein the intermediate portion of the product support members is configured to sequentially deflect as products are stocked thereon such that an amount of deflection of the intermediate portion of the product support member varies with respect to a weight of products stocked thereon;
   one or more laser devices mounted adjacent to the shelving unit and oriented to measure distances to the product support members; and
   a control circuit in communication with the one or more laser devices and configured to analyze the distances to estimate a deflection of each of the product support members and estimate a weight of products stocked on each of the product support members based on the estimated deflections.

2. The stock level indication system of claim 1, wherein the control circuit is configured to be calibrated by analyzing distances of the product support members with the intermediate portions at a maximum deflection height thereof corresponding to an unstocked configuration and analyzing distances of the product support members with the intermediate portions at a minimum deflection height thereof corresponding to a fully stocked configuration.

3. The stock level indication system of claim 2, wherein the control circuit is further configured to:
   access product location information; and
   estimate the number of products on the shelf based on the product location information and the estimated weight.

4. The stock level indication system of claim 3, wherein the control circuit is further configured to send a low stock signal in response to determining that the number of products estimated to be on the shelf is at or below a predetermined number.

5. The stock level indication system of claim 1, wherein the plurality of shelves are mounted to the back wall such that there is a gap between the product support member and the back wall; a depth of the gap varies with the deflection of the product support member; and the one or more laser devices are oriented to measure distances of product support members of lower shelves through the gaps.

6. The stock level indication system of claim 5, wherein one or more of the shelves further comprise a transparent cover portion configured to cover at least a portion of the gap.

7. The stock level indication system of claim 5, wherein, with the same weight on each of the product support members, the shelves are mounted to the back wall such that the gaps of the shelves get sequentially smaller with a lower mounting height.

8. The stock level indication system of claim 1, wherein the back wall is angled outwardly so as to be at an acute angle with horizontal and includes an intermediate opening or transparent portion, such that the shelves are disposed at least partially laterally adjacent to one another when viewed from above the shelving unit.

9. The stock level indication system of claim 1, wherein the one or more laser devices are mounted above the shelving unit.

10. The stock level indication system of claim 1, wherein the one or more laser devices comprise a plurality of laser devices oriented at different angles with respect to the shelving unit.

11. The stock level indication system of claim 1, wherein the distances to the product support members are measured based on a reflection of a beam projected to the product support members by the one or more laser devices.

12. A method for determining a stock level, the method comprising:
   receiving one or more products on one or more of a plurality of shelves of a shelving unit, the shelving unit including an upstanding back wall and the plurality of shelves mounted thereto, the plurality of shelves each including a product support member having an intermediate portion of the product support member that is deflectable with respect to outer edges thereof,
   sequentially deflecting the intermediate portion of the one or more of the plurality of shelves as the one or more products are stocked thereon such that an amount of deflection of the intermediate portion of the product support member varies with respect to a weight of products stocked on the product support member;
   measuring distances to the product support members with one or more laser devices mounted adjacent to the shelving unit; and
   analyzing the distances with a control circuit in communication with the one or more laser devices to estimate a deflection of each of the product support members and estimate a weight of products stocked on each of the product support members based on the estimated deflections.

13. The method of claim 12, further comprising calibrating the control circuit by analyzing distances of the product support members having a maximum deflection height of the intermediate portion corresponding to an unstocked configuration and analyzing distances of the product support members having a minimum deflection height of the intermediate portion corresponding to a fully stocked configuration.

14. The method of claim 13, further comprising:
   accessing product location information; and
   estimating the number of products on the shelf based on the product location information and the estimated weight.

15. The method of claim 14, further comprising sending a low stock signal in response to determining that the number of products estimated to be on the shelf is at or below a predetermined number.

16. The method of claim 12, wherein the plurality of shelves are mounted to the back wall such that there is a gap between the product support member and the back wall; and measuring the distances to the product support members with the one or more laser devices comprises measuring the distances to lower product support members with the one or more laser devices through the gaps.

17. The method of claim 12, wherein measuring the distances to the product support members with one or more laser devices comprises measuring distances to the product support members with a movable laser device.

18. The method of claim 12, wherein measuring the distances to the product support members with one or more laser devices comprises measuring distances to the product support members with a plurality of laser devices oriented at different angles with respect to the shelving unit.

19. The method of claim 12, wherein the distances to the product support members are measured based on a reflection of a beam projected to the product support members by the one or more laser devices.

\* \* \* \* \*